United States Patent [19]
Gordon

[11] 3,895,215
[45] July 15, 1975

[54] CABINET FOR HOLDING FOOD AT A CONTROLLABLE TEMPERATURE

[76] Inventor: Jerry Dale Gordon, 10765 E. 11th St., Tulsa, Okla. 74128

[22] Filed: Nov. 23, 1973

[21] Appl. No.: 418,454

[52] U.S. Cl. ............... 219/400; 126/21 A; 165/19; 174/16 R; 219/386; 312/236
[51] Int. Cl. ........................................... F27d 11/02
[58] Field of Search .......... 219/385, 386, 387, 400; 312/236; 165/19; 126/21 A; 174/16

[56] References Cited
UNITED STATES PATENTS

| | | | |
|---|---|---|---|
| 975,107 | 11/1910 | Ayer et al. | 219/400 |
| 1,218,341 | 3/1917 | Truitt | 219/400 |
| 1,657,205 | 1/1928 | Ehrgott | 219/400 |
| 2,214,630 | 9/1940 | Wheeler | 219/400 |
| 3,192,306 | 6/1965 | Skonnord | 174/16 R |
| 3,221,729 | 12/1965 | Beasley et al. | 126/21 A |
| 3,261,650 | 7/1966 | Stromquist | 312/236 |
| 3,424,231 | 1/1969 | Truhan | 165/19 |
| 3,538,309 | 11/1970 | Welker | 219/386 |
| 3,538,904 | 11/1970 | Baker | 126/21 A |
| 3,614,388 | 10/1971 | Robinson | 219/400 |

FOREIGN PATENTS OR APPLICATIONS
| | | | |
|---|---|---|---|
| 522,007 | 8/1953 | Belgium | 219/400 |

*Primary Examiner*—Volodymyr Y. Mayewsky

[57] ABSTRACT

A cabinet for receiving and holding food or the like includes top, bottom and at least two sides forming a box or container having at least one open side. A door hingedly attached to one of the sides encloses at least one open side. A pair of plenums are located along the vertical length of the sides, each plenum including opposite sides having spaced holes therealong, and having dividing walls within the plenum to separate the air into separate streams to groups of holes to ensure that the air is uniformly distributed along the vertical height of the cabinet to prevent localized zones of uneven temperature.

4 Claims, 2 Drawing Figures

PATENTED JUL 15 1975

3,895,215

CABINET FOR HOLDING FOOD AT A CONTROLLABLE TEMPERATURE

BACKGROUND OF THE INVENTION

1. Field of the Invention

This invention relates to improvements in cabinets for holding food or the like, more particularly, to improvements in means for use in such cabinets for providing uniform air circulation therewithin.

2. Description of the Prior Art

In food handling processes, especially in restaurants and takeout food facilities, frequently food products are pre-prepared and stored within a food holding cabinet to be later packaged or dispensed. The food holding cabinets ordinarily used are insulated cabinets having doors opening on front or back sides, and usually the food products are stored in or upon trays arranged vertically from bottom to top within the cabinet.

To preserve the food and maintain its temperature at the desired serving temperature, typically heated air is circulated within the cabinet to contact the food to ensure that it will retain its natural heat and moisture for some time after its preparation. Commonly, means for introducing humidity or moisture into the circulated air are provided to further enhance the moistness of the food product being maintained.

Such circulation of air is shown, for example, by Stentz, U.S. Pat. No. 3,224,114 which shows a hot and cold food service cart within which air is circulated, the hot and cold zones being separated by a thermal barrier, thereby to define a centrally located portion within which cold air is circulated and outwardly oriented locations adjacent heating coils around and through which hot air is circulated. Another manner in which air is circulated is through the use of plenum chambers aligned or disposed upon sidewalls of a food heating cabinet, in a manner similar to the cabinet disclosed by Skonnord, U.S. Pat. No. 3,192,306. The plenum in the Skonnord patent along the side of the electronic equipment containing cabinet presents a plurality of holes aligned or spaced apart along the vertical length of the plenum to distribute the cool air forced into the plenum to cool the electronic components within the cabinet.

In the prior art food holding cabinets, however, one of the problems which typically develops is that the heated air is inadequately circulated within the cabinet. Because of the ununiform air circulation, hot and cold zones develop which result in the food at such spots being either over or underheated, further causing the food to dry out or become cold and otherwise unappetizing.

SUMMARY OF THE INVENTION

In light of the above, therefore, it is an object of the invention to present an improved food holding cabinet.

It is another object of the invention to present a food holding cabinet in which heated air is circulated uniformly to various vertical zones within the cabinet.

It is yet another object of the invention to present a cabinet for holding food or the like which has a relatively uniform air circulation throughout the cabinet.

It is still another object of the invention to present an improved plenum for use in a food holding cabinet for uniformly circulating air within the cabinet.

These and other objects, features, and advantages will become apparent to those skilled in the art from the following detailed description, when read in conjunction with the appended claims and accompanying drawings.

The invention, in its broad aspect, presents a cabinet for holding food at a controllable temperature. The cabinet includes three sides, a bottom, and a top, to form a box open on one side for receiving the food to be held. A door is hinged to one of the sides in closeable relationship to the open side to enable the cabinet to be closed. Means are provided carried by the cabinet for blowing and controllably heating the air. At least one air distributing plenum is mounted within the box along one side in air receiving relation to the heating and blowing means. The distributing plenum has a plurality of holes spaced apart along its length through a wall through which the air from the blowing and heating means is free to exit. Air division means are also provided within the plenum along at least a portion of its length, to direct portions of the air from the heating and blowing means through at least first and second groups of the plurality of holes.

BRIEF DESCRIPTION OF THE DRAWINGS

The invention is illustrated in the accompanying drawings wherein.

DESCRIPTION OF THE PREFERRED EMBODIMENTS

Figure 1:
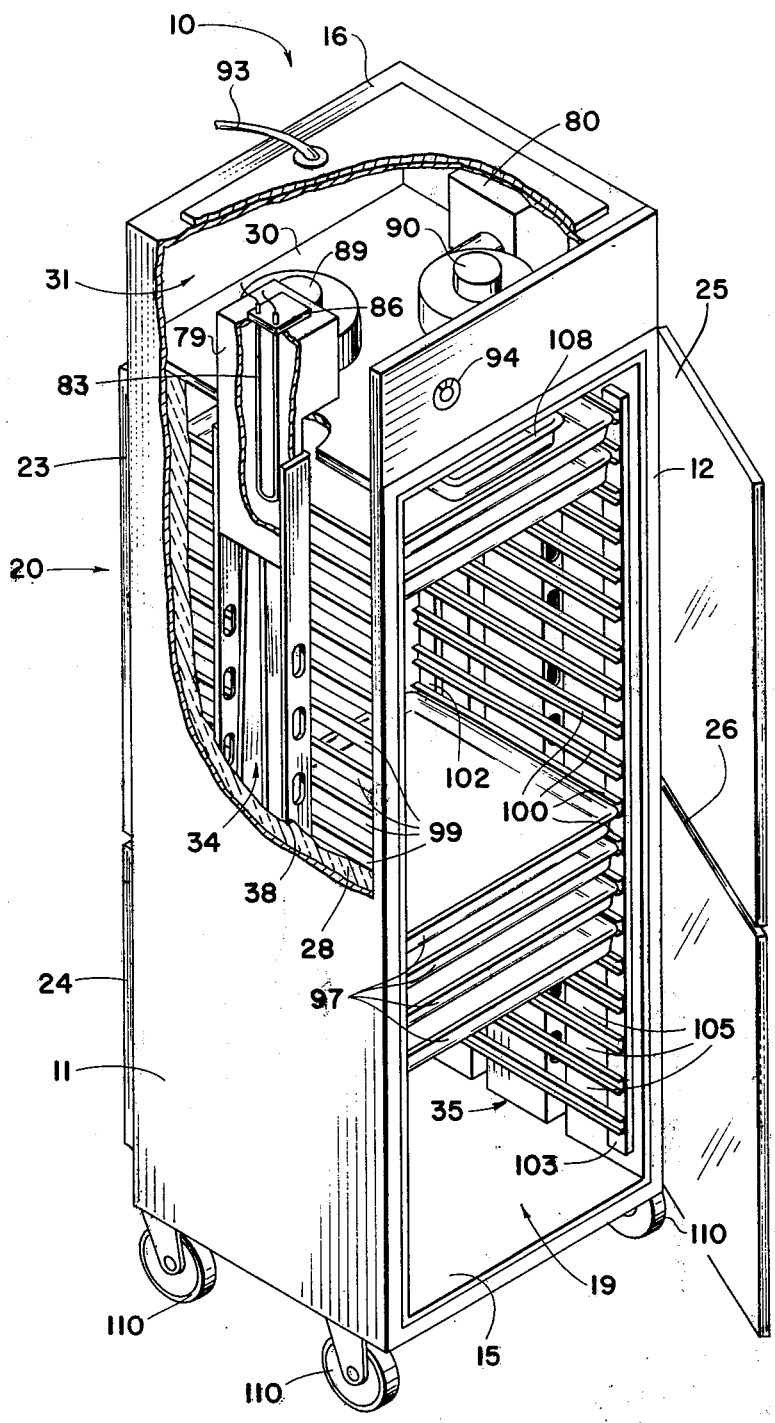
FIG. 1 is a perspective view of a holding cabinet for food or the like, in accordance with the invention, including a pair of air directing plenums.

As shown in FIG. 1, the cabinet, generally denoted by the reference numeral 10, for receiving and holding food and maintaining it at a desired temperature, includes two sides 11 and 12, a bottom 15 and a top 16, forming a box having at least one open side, and, preferably, as shown, having two sides 19 and 20 open to the front and rear for access to the interior of the cabinet.

Four doors 23, 24, 25 and 26 are provided, hingedly attached to one of the sides of the cabinet to enclose the openings 19 and 20 at front and back. If desired, a single door (not shown) can be used to enclose the entire openings of front or back, but if selected access to the top or bottom portion of the interior of the cabinet is desired, half doors can be used, as shown. Alternatively, if access to any number of sections is desired, for example, top, middle, and bottom, any number of enclosing doors can be employed. For instance, one of the primary objects of the invention being to present a cabinet which has a uniform temperature along its vertical height, it is desireable to have doors opening in sections, as shown, to prevent all of the heated and perhaps moisturized air within the cabinet from escaping upon opening a single large door along the opening.

The walls 11 and 12, the bottom 15, and the doors 23–26, for insulation, can be fabricated with an insulation layer thereon, as shown in the cutaway portion in FIG. 1, such as the insulating layer 28.

Across the top within the cabinet 10, a dividing partition 30 is provided to define an area 31 within the cabinet 10 for receiving the blowers, the electrical connections, the thermostats, and controls, as below described. The divider 30 is provided primarily for convenience in locating these elements, to provide a substantially smooth exterior to the cabinet.

Figure 2:
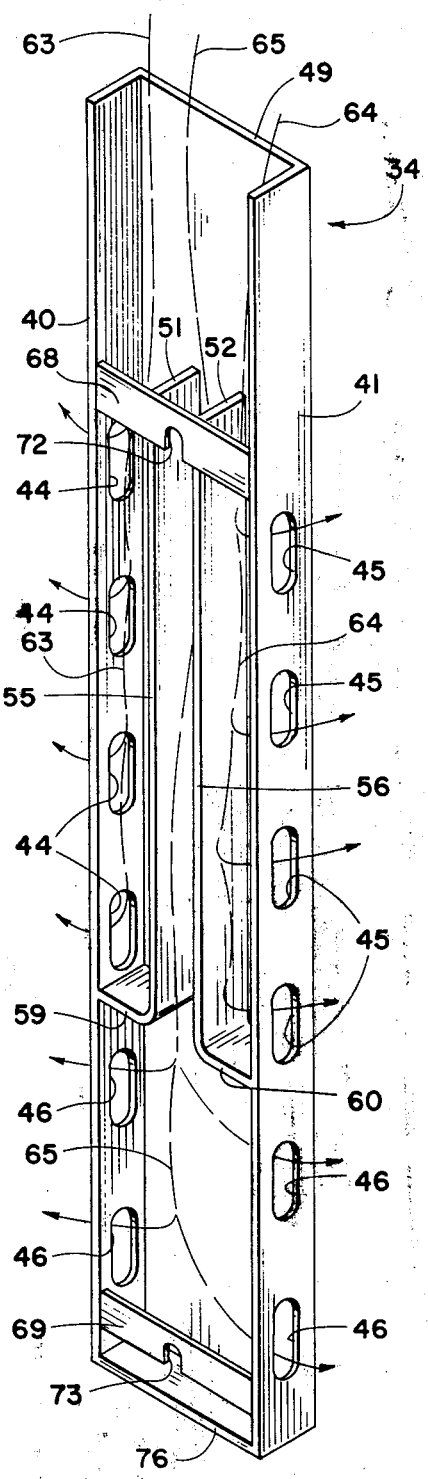
FIG. 2 is a perspective view of a portion of an air directing plenum for use in the cabinet of FIG. 1.

To distribute and circulate the air uniformly within the interior of the cabinet 10, a pair of plenums 34 and 35 are provided, each mounted in a recess, such as the recess 38 shown in the cut-away portion of FIG. 1, along a respective one of the sides 11 and 12 of the cabinet 10. As shown with greater detail in FIG. 2, the plenum 34, of similar construction to the other plenum 35, includes elongated sidewalls 40 and 41 having holes, denoted by the reference numerals 44, 45, and 46, designated in groups spaced apart along its length, the sidewalls 40 and 41 being attached to an end wall 49 to form a U-shaped channel. The U-shaped channel, when located adjacent the surface of the sidewall 11 of the cabinet within the groove 38 forms an enclosed plenum box through which air is free to travel. It should be noted that in FIG. 1 the back wall of the plenum 34 is formed by the inside wall of the wall 11 of the cabinet, as illustrated, the plenum completing portion of the wall 11 partially cut-away. Within the interior of the U-shaped channel, a pair of L-shaped members 51 and 52 are provided. The L-shaped members 51 and 52 each have a long portion 55 and 56 and a short portion 59 and 60, the long portions 55 and 56, being aligned in a generally parallel fashion, as shown, and the short portions 59 and 60 each extending to one of the respective sidewalls 40 and 41. Thus, as air is blown or forced into the plenum, it is separated into three streams 63, 64, and 65. The first stream 63 is directed to the first group of the holes 44 of the plenum to exit therethrough in the direction of the back side of the cabinet 10. The second stream 64 is directed to the second group of holes 45, generally opposite the first, to direct the forced air in the direction of the front side of the cabinet. Finally, between the upright members of the L-shaped members, the third direction of air flow or stream 65 is defined, to the third group of holes 46 toward the bottom portion of the plenum to be blown simultaneously to the front and back of the cabinet 10.

To facilitate mounting the U-shaped channel onto the sidewall 11 of the cabinet, two cross-members 68 and 69 are provided, each having a slot 72 and 73 formed at its downward edge to receive a button or catch (not shown) extending outwardly from the inner-surface of the sidewall 11 of the cabinet 10 at a corresponding location. The bottom of the U-shaped channel is closed by a plate 76, as shown, to prevent the air from blowing out through the bottom. Alternatively, if desired, the U-shaped channel can be made of sufficient length (not shown) to rest upon the bottom 15 of the cabinet 10 when in location, the bottom 15 of the cabinet 10 thereby forming the equivalent of the bottom plate 76 above described.

When the U-shaped channels are located within the cabinet, as shown in FIG. 1, the top portions of each are disposed around smaller plenums 79 and 80, each containing a heater element, heater element 83 within the smaller plenum 79 being shown in the cut-away portion of FIG. 1. To facilitate repair or exchange of the heater element, they can be mounted, if desired, upon a plate such as the plate 86 upon which heater element 83 is mounted, and inserted through a hole in the top of the smaller plenum 79. The other plenum 80, similar to plenum 79 is located on the opposite wall 12 above which the other U-shaped channel is disposed in position adjacent to the wall forming the elongated plenum 35.

A pair of blowers 89 and 90 are provided, each blowing air into a respective one of the smaller plenums 79 and 80 from within the cabinet 10. This is achieved, for example, by locating a side-opening intake type blower over a hole (not shown) through the divider or partition 30 at the top of the cabinet 10, and fastening the outlet opening adjacent a hole in its respective smaller plenum, 79 or 80 as shown. The heaters in the respective small plenums 79 and 80 and the blowers 89 and 90 are energized by current from a power cord 93, and controlled by a thermostat 94 to maintain the desired temperature within the cabinet 10.

Thus the air is circulated through the partition 30 at the top of the cabinet 10 into one of the blowers 89 or 90 thereover. The air is then blown by the blowers 89 and 90 into a respective smaller plenum 79 and 80, to therein be heated by the contained heater. Thereafter, the heated air is blown down into the respective elongated side plenums 34 and 35, divided by the L-shaped members into three flow streams (as shown by the arrows in FIG. 2), to be thereafter exited through a group of holes in the side plenums.

A number of trays 97 are located within the cabinet 10, each located one above the other, and received in a respective pair of channels 99 and 100, mounted on opposite sides of the cabinet, for example, with respect to the wall 12, by vertical braces 102 and 103. The vertical braces 102 and 103 space the tray receiving channels 99 and 100 away from the wall to which they are mounted to thereby provide an air flow area 105 between the tray receiving channels 100 and the wall 12. The air exiting from the holes 44, 45, and 46 in the channels, therefore, flows between the trays 97, upwardly around the tray receiving channels 100, and into the holes (not shown) of the blowers 89 and 90 through the partition 30 across the top of the cabinet 10.

If desired, a water reservoir 108 can be located upon the top tray or shelf, directly below the holes (not shown) through the top partition 30 to the intake of the blowers, to provide humidity or moisture to the air flowing within the cabinet 10.

To enable the cabinet 10 to be moved from one location to another, if desired, castors or wheels 110 can be mounted to the bottom 15 of the cabinet 10.

The parts of the cabinet 10 are preferably fabricated from a material which is resistent to corrosion, and which is easy to maintain. Stainless steel, for example, has been found to be particularly suitable for this purpose.

Although the invention has been described and illustrated with a certain degree of particularity, it is understood that numerous changes in the arrangement and combination of parts may be resorted to without departing from the spirit and scope of the invention as hereinafter claimed.

I claim:

1. A cabinet for holding food at a controllable temperature, comprising:
   a box open on one side for receiving the food to be held including three sides, a bottom, and a top,
   a door hinged to one of said sides in closeable relation to the open side,
   said sides, bottom, top and door forming thermally insulated walls for said cabinet, means carried by said box for blowing and controllably heating air, said means carried by said box for blowing and controllably heating air including electrical heating means for heating the air, a motor means for the blowing means and an electrical circuit for powering said electrical heating means and said motor means, at least one air distributing plenum carried within said box along one side in air receiving relation to said heating and blowing means, and having a plurality of holes spaced apart vertically along its length through a wall thereof through which air from said blowing and heating means is free to exit, and air division means along a portion of the length of said at least one plenum to direct portions of the air from said heating and blowing means to at least first and second vertically spaced groups of said plurality of holes.

2. The cabinet of claim 1 wherein said at least one air distributing plenum is two in number.

3. The cabinet of claim 2 wherein each of said air distributing plenums comprises:

three elongated walls to form a general U-shape each mountable on one of said walls, whereby the wall upon which it is mounted forms an enclosing wall to define the plenum, said plurality of holes being arranged on opposite walls of said U-shape.

4. The cabinet of claim 3 wherein said air division means for each of said plenums comprises a pair of L-shaped members, each of width approximately equal to the width of said plenum and having an elongated side and a short side, said pair of L-shaped members being mounted within said plenum with said long sides parallel to each other and said short sides oriented away from the direction of air flow and extending to the walls of said plenum, whereby the air is divided by said elongated sides into three flow areas and distributed among three groups of said plurality of holes.

* * * * *